W. M. Welling,
Glass Mold,
N° 108,660.   Patented Oct. 25, 1870.
Fig. 4.
Fig. 3.
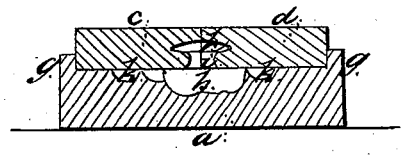
Fig. 2.
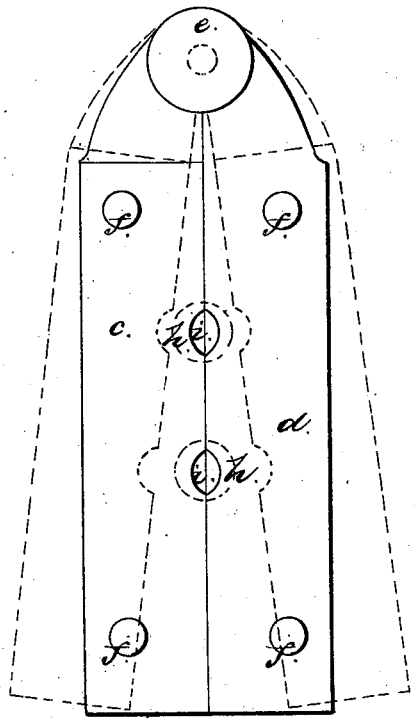
Fig. 1.
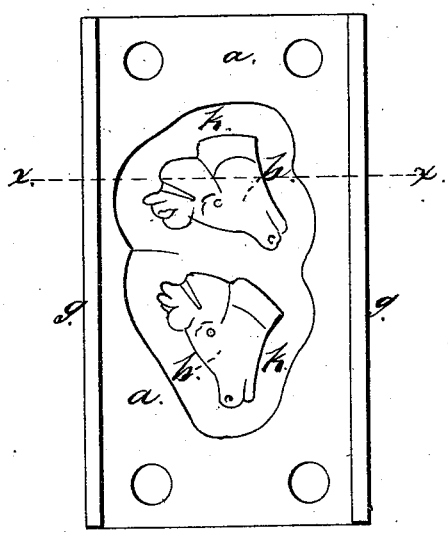
Witnesses:
Chas. H. Smith
Geo. D. Walker
Inventor:
Wm. M. Welling

United States Patent Office.

WILLIAM M. WELLING, OF NEW YORK, N. Y.

Letters Patent No. 108,660, dated October 25, 1870.

IMPROVEMENT IN DIES FOR MOLDING BUTTONS.

The Schedule referred to in these Letters Patent and making part of the same.

*To all whom it may concern:*

Be it known that I, WILLIAM M. WELLING, of the city and State of New York, have invented an Improvement in Dies for Molding Buttons, &c.; and the following is declared to be a correct description thereof.

This die is for making sleeve-buttons and other articles out of plastic compositions by pressure.

Reference is hereby made to Letters Patent numbered 77,938, 89,100, 89,531, and 89,532, as describing compositions, to the pressing of which this die may be employed.

In the drawing—

Figure 1 is a plan of the ornamental die that makes the face of the buttons;

Figure 2 is an inverted plan of the under face of the die that forms the shank;

Figure 3 is a cross-section at the line $x\ x$; and

Figure 4 is a vertical section of a button molded in my dies.

In making buttons, a metal shank in the form of a disk or a wire loop has been used, and plastic composition has been pressed around such shank.

With my present device I am enabled to make the entire button of the plastic composition, and thereby avoid the expense of the metal shanks and plates, and the articles are stronger, and there is nothing of metal to tarnish, as so frequently happens with articles of this class.

The die $a$ is made of a block of metal, the surface of which is recessed, as at $b\ b$, in the ornamental form required for the article that is to be made.

The two-part die $c\ d$ is hinged together at one end at $e$, and the pins $f$ serve to guide and steady the die $c\ d$, as it is pressed upon the die $a$, and the flanges $g$ at the sides prevent the dies $c\ d$ separating.

In the contiguous inner edges of the dies $c\ d$ recesses $l\ h$ are formed for the shank and button-head, respectively, of the usual size and style; but if the dies $c\ d$ were made rigid or out of one piece, the button-heads could not be removed, therefore, the two pieces of the die $c\ d$ are hinged at $e$, and can be opened for the removal of the shank and disk of the button.

Around the recessed portion $b$ of the die $a$, there is a cavity, $k$, into which surplus material will be pressed, and afterward removed.

If stones are to be inserted in the button to form eyes for animals' heads, as shown, or for other ornamental purposes, the die $b$ is to be recessed at the proper point or points to receive the stones or imitations, so that the plastic mass may be pressed around such stones to hold them in place.

It is now to be understood that a piece of plastic material is placed in each cavity in the die $a$ of a proper size for the article to be made, and, generally, it will be necessary to have the plastic material in a hot state, and the dies also warm.

When the die $c\ d$ is pressed upon the plastic material, the cavity $i$ for the shank is filled, and the plastic material spread to fill the cavity in $a$, and such plastic material is firmly compressed and compacted, the surplus material passing over into the recess $k$.

When the material is sufficiently set, the dies $a$ and $c\ d$ are to be drawn apart, the button will be lifted out by the dies $c\ d$, and then liberated by opening those dies $c\ d$, allowing the pin and disk forming the shank of the button to be disengaged.

The button is then removed, and the fin or feather that may have been formed upon the button at the divisions of the mold is separated or removed.

I claim as my invention—

The divided die $c\ d$, with the recesses for the shanks of the button, in combination with the die $a$, having a recess, $b$, and the flanges $g$, substantially as and for the purposes set forth.

Dated August 15. A D. 1870.

WM. M. WELLING.

Witnesses:
GEO. T. PINCKNEY,
CHAS. H. SMITH.